United States Patent
Yoshimitsu et al.

(10) Patent No.: US 8,965,050 B2
(45) Date of Patent: Feb. 24, 2015

(54) BEHAVIOR ANALYSIS DEVICE

(75) Inventors: Yuji Yoshimitsu, Otsu (JP); Takeshi Naito, Ibaraki (JP); Shunsuke Kamijo, Tokyo (JP); Kaichi Fujimura, Tokyo (JP)

(73) Assignees: OMRON Corporation, Kyoto (JP); The University of Tokyo, Tokyo (JP)

(*) Notice: Subject to any disclaimer, the term of this patent is extended or adjusted under 35 U.S.C. 154(b) by 74 days.

(21) Appl. No.: 13/820,084

(22) PCT Filed: Aug. 10, 2011

(86) PCT No.: PCT/JP2011/068247
§ 371 (c)(1),
(2), (4) Date: Feb. 28, 2013

(87) PCT Pub. No.: WO2012/029518
PCT Pub. Date: Mar. 8, 2012

(65) Prior Publication Data
US 2013/0164722 A1    Jun. 27, 2013

(30) Foreign Application Priority Data

Aug. 31, 2010 (JP) ................................. 2010-193109
Feb. 21, 2011 (JP) ................................. 2011-034096

(51) Int. Cl.
*G06K 9/00* (2006.01)
*G09B 19/00* (2006.01)

(52) U.S. Cl.
CPC ............ *G06K 9/00771* (2013.01); *G09B 19/00* (2013.01)
USPC ............................ 382/103; 382/106; 382/107

(58) Field of Classification Search
None
See application file for complete search history.

(56) References Cited

U.S. PATENT DOCUMENTS

| 7,671,725 B2 * | 3/2010 | Tsuji et al. ..................... 340/435 |
| 2005/0078178 A1 * | 4/2005 | Brown et al. ................. 348/139 |
| 2010/0166262 A1 * | 7/2010 | Wedge .......................... 382/103 |

FOREIGN PATENT DOCUMENTS

| JP | 06-213632 A | 8/1994 |
| JP | 2001-056853 A | 2/2001 |
| JP | 2002-197463 A | 7/2002 |
| JP | 2002-344946 A | 11/2002 |
| JP | 2002344946 A * | 11/2002 |

(Continued)

OTHER PUBLICATIONS

International Search Report issued in PCT/JP2011/068247 mailed on Nov. 1, 2011 (4 pages).

(Continued)

*Primary Examiner* — Anand Bhatnagar
*Assistant Examiner* — Soo Park
(74) *Attorney, Agent, or Firm* — Osha Liang LLP

(57) ABSTRACT

A behavior analysis device has an object extraction portion that processes a frame image of an imaging area being imaged by an imaging device and extracts an object being imaged, a position detection portion that detects a position in the imaging area, for each object extracted by the object extraction portion, a posture estimation portion that estimates an posture of the object, for each object extracted by the object extraction portion, and a behavior determination portion that determines a behavior of the object, for each object extracted by the object extraction portion, based on the position in the imaging area that is detected by the position detection portion and the posture estimated by the posture estimation portion.

6 Claims, 15 Drawing Sheets

(56) References Cited

FOREIGN PATENT DOCUMENTS

| | | |
|---|---|---|
| JP | 2010-237873 A | 10/2010 |
| JP | 2010-244089 A | 10/2010 |

OTHER PUBLICATIONS

Patent Abstracts of Japan for Publication No. 2002-344946, Publication Date: Nov. 29, 2002 (1 Page).
Patent Abstracts of Japan for Publication No. 2002-197463, Publication Date: Jul. 12, 2002 (1 Page).
Patent Abstracts of Japan for Publication No. 06-213632, Publication Date: Aug. 5, 1994 (1 Page).
Patent Abstracts of Japan for Publication No. 2001-056853, Publication Date: Feb. 27, 2001 (1 Page).
Patent Abstracts of Japan for Publication No. 2010-237873, Publication Date: Oct. 21, 2010 (1 Page).
Patent Abstracts of Japan for Publication No. 2010-244089, Publication Date: Oct. 28, 2010 (1 Page).

* cited by examiner

FIG.2A

OBJECT A

| TYPE | POSTURE | POSITION | HEIGHT OF UPPER SIDE | HEIGHT OF LOWER SIDE | LOCATION INFORMATION | TIME |
|---|---|---|---|---|---|---|
| PERSON | STANDING | (xa1,ya1) | Ha1 | La1 | FLOOR | Ta1 |
| PERSON | STANDING | (xa2,ya2) | Ha2 | La2 | FLOOR | Ta2 |
| PERSON | STANDING | (xa3,ya3) | Ha3 | La3 | FLOOR | Ta3 |
| ○○○ | ○○○ | ○○○ | ○○○ | ○○○ | ○○○ | ○○○ |

FIG.2B

OBJECT B

| TYPE | POSTURE | POSITION | HEIGHT OF UPPER SIDE | HEIGHT OF LOWER SIDE | LOCATION INFORMATION | TIME |
|---|---|---|---|---|---|---|
| ARTICLE |  | (xb1,yb1) | Hb1 | Lb1 | FLOOR | Tb1 |
| ARTICLE |  | (xb1,yb1) | Hb1 | Lb1 | FLOOR | Tb2 |
| ARTICLE |  | (xb1,ya1) | Hb1 | Lb1 | FLOOR | Tb3 |
| ○○○ | ○○○ | ○○○ | ○○○ | ○○○ | ○○○ | ○○○ |

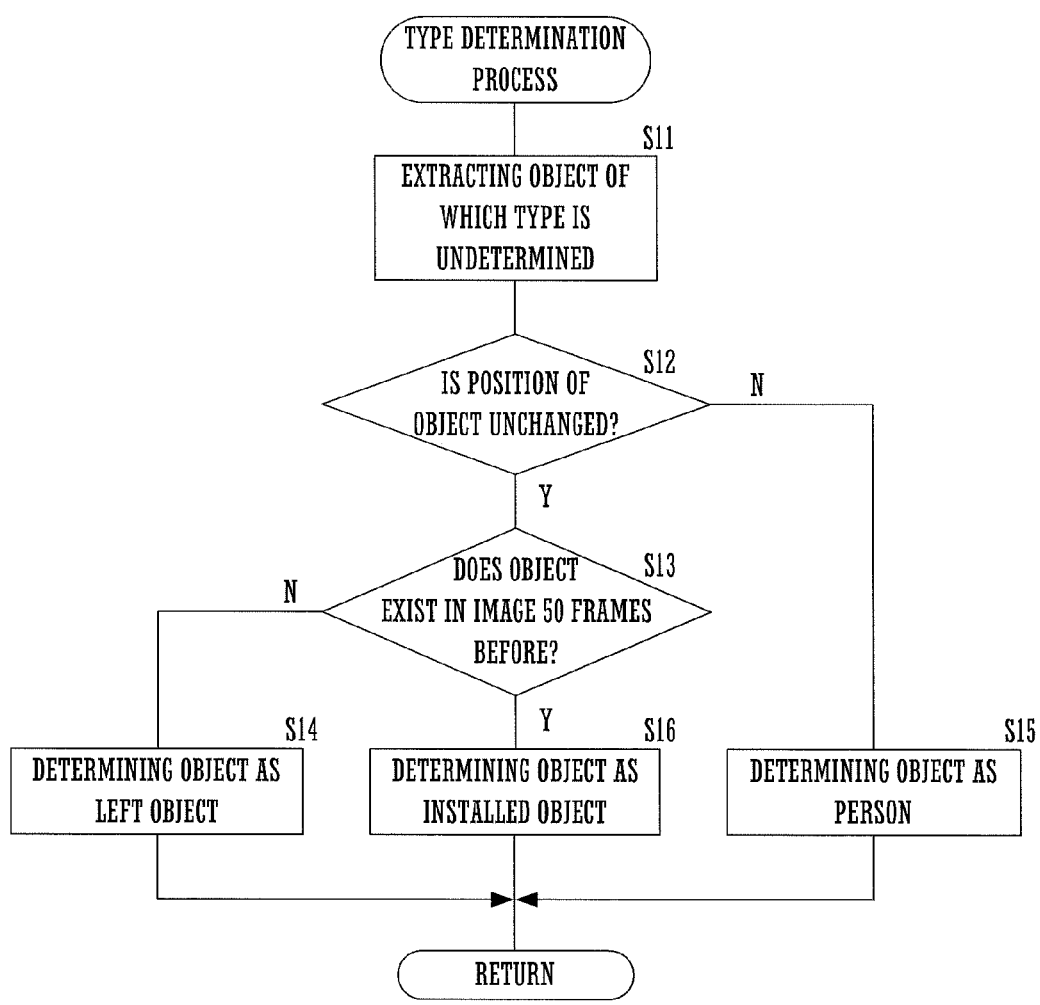

FIG.12A

OBJECT A

| TYPE | POSTURE | POSITION | LOCATION INFORMATION | TIME |
|---|---|---|---|---|
| PERSON | STANDING | (xa1,ya1) | FLOOR | Ta1 |
| PERSON | STANDING | (xa2,ya2) | FLOOR | Ta2 |
| PERSON | STANDING | (xa3,ya3) | FLOOR | Ta3 |
| ○○○ | ○○○ | ○○○ | ○○○ | ○○○ |

FIG.12B

OBJECT B

| TYPE | POSTURE | POSITION | LOCATION INFORMATION | TIME |
|---|---|---|---|---|
| ARTICLE | | (xb1,yb1) | FLOOR | Tb1 |
| ARTICLE | | (xb1,yb1) | FLOOR | Tb2 |
| ARTICLE | | (xb1,ya1) | FLOOR | Tb3 |
| ○○○ | ○○○ | ○○○ | ○○○ | ○○○ |

FIG.14A

OBJECT A

| TYPE | POSTURE(X) | POSTURE(Y) | POSITION | LOCATION INFORMATION | TIME |
|---|---|---|---|---|---|
| PERSON | STANDING | STANDING | (xa1,ya1) | FLOOR | Ta1 |
| PERSON | STANDING | STANDING | (xa2,ya2) | FLOOR | Ta2 |
| PERSON | STANDING | STANDING | (xa3,ya3) | FLOOR | Ta3 |
| ○○○ | ○○○ | ○○○ | ○○○ | ○○○ | ○○○ |

FIG.14B

OBJECT B

| TYPE | POSTURE(X) | POSTURE(Y) | POSITION | LOCATION INFORMATION | TIME |
|---|---|---|---|---|---|
| ARTICLE | | | (xb1,yb1) | FLOOR | Tb1 |
| ARTICLE | | | (xb1,yb1) | FLOOR | Tb2 |
| ARTICLE | | | (xb1,ya1) | FLOOR | Tb3 |
| ○○○ | ○○○ | ○○○ | ○○○ | ○○○ | ○○○ |

FIG.15A

TICKET GATE AREA

| IMAGE PROCESSING PORTION 13Y \ IMAGE PROCESSING PORTION 13X | STANDING | STOOPING | SITTING | LYING DOWN |
|---|---|---|---|---|
| STANDING | WALKING | | | |
| STOOPING | | ILLEGAL GATING | | |
| SITTING | | | | |
| LYING DOWN | | | | |

FIG.15B

BENCH AREA

| IMAGE PROCESSING PORTION 13Y \ IMAGE PROCESSING PORTION 13X | STANDING | STOOPING | SITTING | LYING DOWN |
|---|---|---|---|---|
| STANDING | WALKING | | | |
| STOOPING | SICK PERSON, DRUNKEN PERSON | | | |
| SITTING | | | SITTING ON BENCH | |
| LYING DOWN | | | | SICK PERSON, DRUNKEN PERSON |

FIG.15C

FLOOR

| IMAGE PROCESSING PORTION 13Y \ IMAGE PROCESSING PORTION 13X | STANDING | STOOPING | SITTING | LYING DOWN |
|---|---|---|---|---|
| STANDING | WALKING | | | |
| STOOPING | | | | |
| SITTING | | | | |
| LYING DOWN | | SICK PERSON, DRUNKEN PERSON | | |

BEHAVIOR ANALYSIS DEVICE

BACKGROUND

1. Technical Field

The present invention relates to a behavior analysis device that processes a frame image of a target area being imaged by an imaging device such as a video camera and analyzes the behavior of a person being imaged.

2. Background Art

Conventionally, in a place in which an unspecified number of people gather together, such as a station, a shopping center, or a busy street, the image imaged by a set monitoring camera (hereinafter, simply referred to as a camera) is processed to detect a person such as a suspicious person having a suspicious behavior (hereinafter, simply referred to as a suspicious person) and the like. Specifically, the frame image being imaged by a camera is processed, the behavior of a person being imaged is analyzed, and whether the behavior is suspicious or not is determined. In addition, the detection of a person having a suspicious behavior related to an illegal act is also reported to a security guard and the like.

For example, Patent Literature 1 describes a configuration in which a plurality of imaging devices (which are so-called stereo cameras) having different viewpoints are used, the images of an object imaged by each imaging device are processed, a three-dimensional position of a representative point of the object is detected, and a three-dimensional image is generated. Then, the behavior of the object is analyzed by determining the movement and the posture of the object from the generated three-dimensional image of the object.

CITATION LIST

Patent Literature

Patent Literature 1: Japanese Patent Laid-Open Publication No. H6-213632

SUMMARY

However, in order to generate the three-dimensional image of the imaged object, the above stated Patent Literature 1 requires a stereo camera, and an image processing portion that processes the image imaged by the stereo camera and generates the three-dimensional image. Thus, Patent Literature 1 has an increase in the size and cost of the system.

One or more embodiments of the present invention provides a behavior analysis device that is capable of accurately determining the behavior of an object without using the three-dimensional information of the object, and of adequately suppressing increases in the size and cost of a system.

A behavior analysis device according to one or more embodiments of the present invention is configured as follows.

An object extraction portion processes a frame image of an imaging area being imaged by an imaging device and extracts an object being imaged. The object extracted here refers to a person or an article. A position detection portion detects a position in the imaging area, for each object extracted by the object extraction portion. Further, a posture estimation portion estimates a posture of the object, for each object extracted by the object extraction portion. Then, a behavior determination portion determines a behavior of the object, for each object extracted by the object extraction portion, on the basis of the position in the imaging area that is detected by the position detection portion and the posture estimated by the posture estimation portion.

The posture estimation portion may further estimate the posture of the object, for example, based on the height and the width of the object extracted by the object extraction portion. Specifically, the posture estimation portion may set a rectangular area surrounding the object extracted by the object extraction portion and estimates the posture of the object based on a ratio (a so-called aspect ratio) between the height and the width of the rectangular area.

Furthermore, the posture estimation portion may estimate the posture of the object by including changes in the height of an upper side and the height of a lower side of the set up rectangular area surrounding the object in addition to the height of the rectangular area and the width of the rectangular area. In this case, if the object is a person, it can be estimated that the person has stooped down when the height of the upper side is changed downward, and it can be estimated that the person has jumped up when the height of the lower side is changed upward.

Moreover, the posture estimation portion may calculate a similarity between a shape of the object extracted by the object extraction portion and a shape model stored by a posture model storage portion for each posture of the object, and may estimate the posture of the object on the basis of the similarity calculated here. In this case, a posture corresponding to a shape model of which the calculated similarity is the maximum similarity may be estimated as the posture of the object.

Additionally, the object extraction portion may extract an object be imaged, for each frame image of the imaging area being imaged by different angles by a plurality of imaging devices, and an identification portion may identify the object extracted by the object extraction portion among a plurality of the frame images imaged by the plurality of imaging devices. In this case, the posture estimation portion may determine the posture of the object extracted by the object extraction portion and identified by the identification portion by a combination of the postures estimated for each frame image being imaged by the plurality of imaging devices.

Further, a location information storage portion may store location information set by associating an area on the corresponding frame image with an environment of a location for each area obtained by dividing the imaging area into a plurality of areas. In this case, the behavior determination portion may determine the behavior of the object in view of the environment of the location obtained from the location information, the location being in which the object is positioned. Accordingly, the behavior of object such as a person being imaged can be estimated according to a location being imaged by a monitoring device.

Furthermore, an object map creation portion may create an object map in which the position detected by the position detection portion and the posture estimated by the posture estimation portion are registered in time sequence for the object extracted by the object extraction portion. In this case, the behavior determination portion may determine the behavior of the object from a change in the position of the object with a lapse of time and from a change in the estimated posture, the changes being obtained from the object map created by the object map creation portion. Accordingly, the behavior of the object can be estimated on the basis of the movement of the object.

It is to be noted that the object referred to in one or more of the above embodiments includes not only a person but baggage and the like.

According to one or more embodiments of the present invention, the behavior of an object can be accurately determined without using the three-dimensional information of the object and the increases in the size and cost of a system can be adequately suppressed.

BRIEF DESCRIPTION OF DRAWINGS

FIG. 2A is a view showing an object map of an object A, and FIG. 2B is a view showing an object map of an object B;

FIG. 6 is a flowchart for determining a type of the object;

FIG. 12A is a view showing an object map of an object A, and FIG. 12B is a view showing an object map of an object B;

FIG. 14A is a view showing an object map of an object A, and FIG. 14B is a view showing an object map of an object B; and FIGS. 15A, 15B, and 15C are views showing behavior determination tables.

DETAILED DESCRIPTION

Hereinafter, a behavior analysis device according to embodiments of the present invention will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
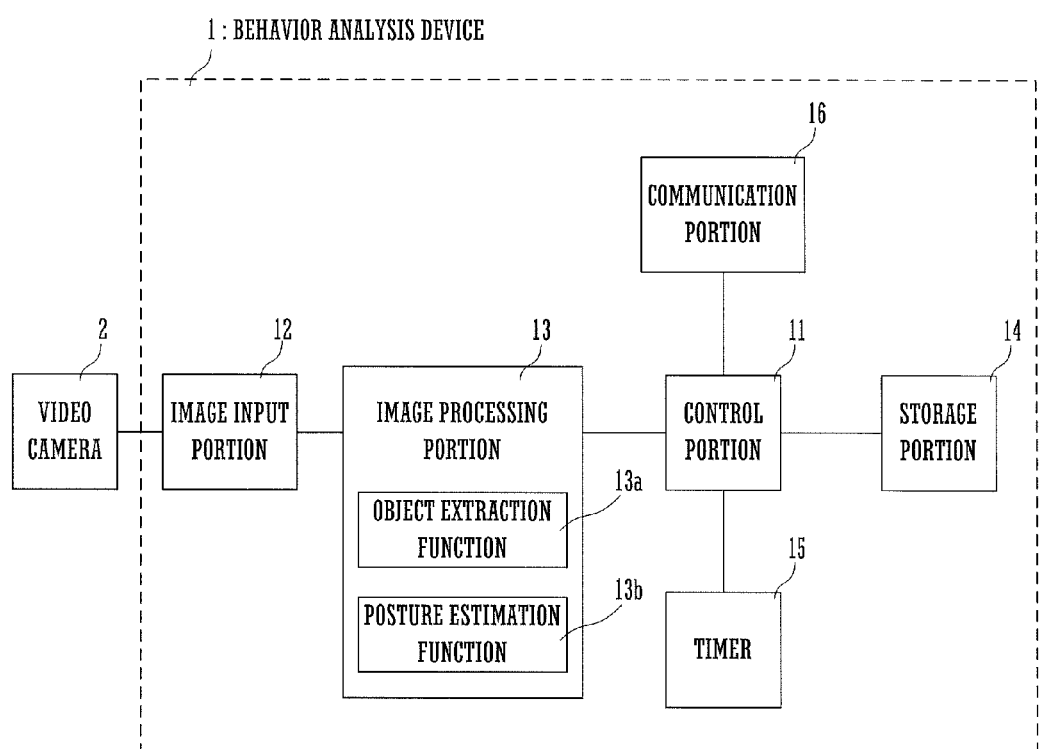
FIG. 1 is a block diagram showing a configuration of a main part of a behavior analysis device.

FIG. 1 is a block diagram showing a configuration of a main part of the behavior analysis device according to one or more embodiments of the present invention. The behavior analysis device 1 according to one or more embodiments of the present invention processes a frame image being imaged by a video camera 2 installed as a monitoring camera, and extracts an object (a person and an article) being imaged. The video camera 2 inputs some ten frames (for example, 30 frames) of frame images per second to an image input portion 12. The video camera 2 images a monitoring target area such as a ticket gate of a station and a station platform, for example. In addition, the behavior analysis device 1, if the extracted object is a person, determines the behavior of the person.

Further, the behavior analysis device 1 also has the function, if the extracted object is an article, of searching a person who has left the article.

The behavior analysis device 1 is equipped with a control portion 11, the image input portion 12, an image processing portion 13, a storage portion 14, a timer 15, and a communication portion 16. The control portion 11 controls the operation of the main body of the behavior analysis device 1.

Into the image input portion 12, the frame image being imaged by the video camera 2 connected to the image input portion 12 is input.

The image processing portion 13 has an object extraction function 13a and a posture estimation function 13b. The object extraction function 13a processes the frame image input from the video camera 2, and extracts, as an object, a person, an article, and the like that are being imaged. The object extraction function 13a also adds an ID to the extracted object and detects the position (the position on the frame image) of the object. This ID is a unique value that can identify an object. In addition, the image processing portion 13 processes a plurality of frame images of the Video camera 2, the frame images being temporally successive, and tracks the object (a person or an article that an ID is added to) positioned in the object positioned in the imaging area of the video camera 2 by creating an object map. The object map will be described later.

The image processing portion 13 uses the spatio-temporal MRF (Markov Random Field) model to extract and track the object being imaged. The spatio-temporal MRF model is, as is known, a spatio-temporal model expanded from an MRF model with attention focused on the correlation between spatio-temporal images in the temporal axis direction. The spatio-temporal MRF model is a model which defines the correlation in the temporal axis direction by dividing the area of each frame image to be subjected to processing into blocks each having some pixels×some pixels (8 pixels×8 pixels, for example) and referring to a motion vector for each block between temporally successive frame images.

Additionally, the posture estimation function 13b estimates the posture of the object extracted by the object extraction function 13a. Specifically, the posture estimation function 13b sets up a rectangular area surrounding the object extracted by the object extraction function 13a. The rectangular area is also set up so as to circumscribe the extracted object. The posture estimation function 13b estimates the posture of the object based on a ratio of the height and the width of the rectangle set up here, that is, an aspect ratio.

For example, the posture of the object is estimated that:

the object is in a standing position if the ratio of the height $\alpha$ and the width $\beta$ of the rectangular area surrounding the object is $\beta/\alpha < 0.6$;

the object is in a stooping or jumping position if the ratio is $0.6 < \beta/\alpha < 1.5$; and the object is in a lying position if the ratio is $1.5 < \beta/\alpha$.

It is to be noted that although the rectangular area is set up to the extracted object in one or more embodiments of the present invention, the posture may be estimated by detecting the height $\alpha$ and the width $\beta$ of the object without setting up a rectangular area.

The behavior analysis device 1 determines an object of which the position on the frame image is not changed for a predetermined period of time (about some ten seconds) is defined as baggage (a left article). The period of time may be set up according to the monitoring target area. The behavior analysis device 1 can obtain a change with a lapse of time in the position of the object for each object by referring to the object map.

FIGS. 2A and 2B are views showing object maps. The object map is created, as shown in FIGS. 2A and 2B, for each object extracted by the image processing portion 13. FIGS. 2A and 2B show examples of the object map created for the object A (see FIG. 2A) and the object B (see FIG. 2B) that are the extracted objects. The object A is a person and the object B is an article. As shown in FIGS. 2A and 2B, the object map registers in time sequence a record that associates a type of an object (a person or an article), a posture (only for a person), a position, a height of an upper side of the rectangular area surrounding the object, a height of a lower side of the rectangular area surrounding the object, location information, and time. As stated above, the image processing portion 13 creates the object map. The storage portion 14 stores the object map.

Figure 3A:
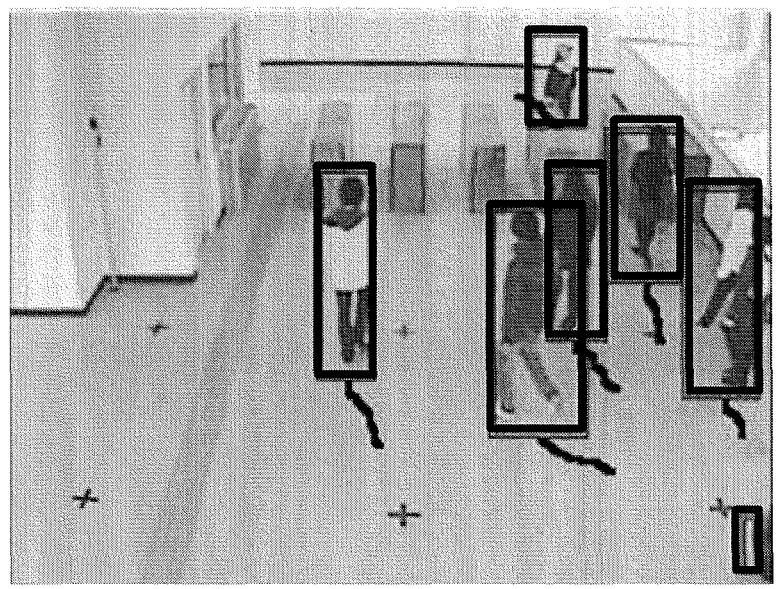
FIGS. 3A and 3B are views illustrating location information set up for each area obtained by dividing an imaging area of a video camera.
Figure 3B:
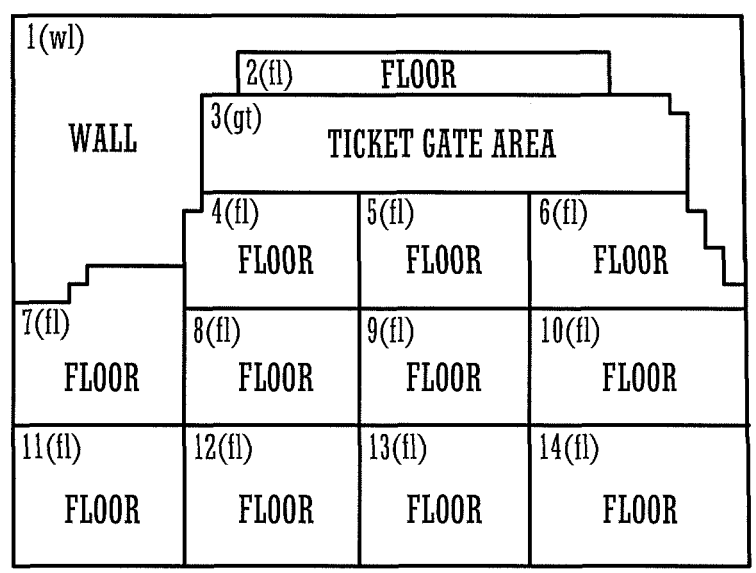
Figure 4A:
FIGS. 4A and 4B are views illustrating location information set up for each area obtained by dividing the imaging area of the video camera.
Figure 4B:
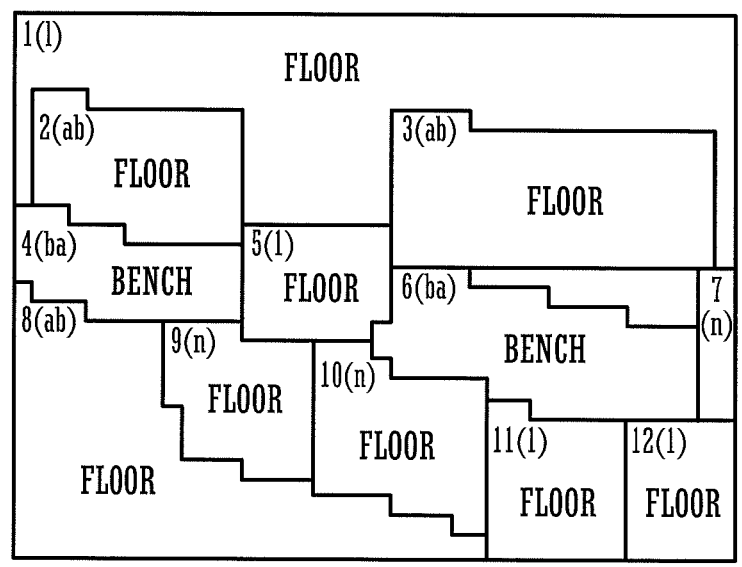

The location information of the object maps shown in FIGS. 2A and 2B is information that shows the environment of the location. For example, the location information shows a floor that is a passing street for an unspecified number of people, a ticket gate area in which an automatic ticket gate is installed, and a bench area in which a bench is installed. The location information also divides the imaging area of the video camera 2, as shown in FIGS. 3A and 3B, and is set up for each divided area. FIG. 3A shows an imaged image of a periphery of a ticket gate by the video camera 2. FIG. 3B is a view showing an example of setting up location information to the imaging areas as shown in FIG. 3A. FIG. 4A shows an imaged image of a station platform by the video camera 2. FIG. 4B is a view showing an example of setting up location information to the imaging areas as shown in FIG. 4A.

The storage portion 14 stores setting parameters used at a time of operation of the behavior analysis device 1, processed data (including the above described object map) generated at the time of operation, and the like. The timer 15 clocks current time. The communication portion 16 controls communication between upper devices that are not illustrated.

The behavior analysis device 1 not only can analyze the behavior of one object (a single object), but can analyze the behavior associated among a plurality of objects. By the analysis of the behavior of the single object, illegal passing (a forced breakthrough) of an automatic ticket gate, and wandering, sitting in, falling down, staying, and a drunken person at a station platform and around a ticket gate can be detected. By the analysis of the behavior of the plurality of objects, illegal passing (tailgating) of an automatic ticket gate, leaving a suspicious article, taking away, a quarrel, stalking, a street scam, a random attack, and the like can also be detected.

Hereinafter, the operation of the behavior analysis device 1 according to one or more embodiments of the present invention will be described.

Figure 5:
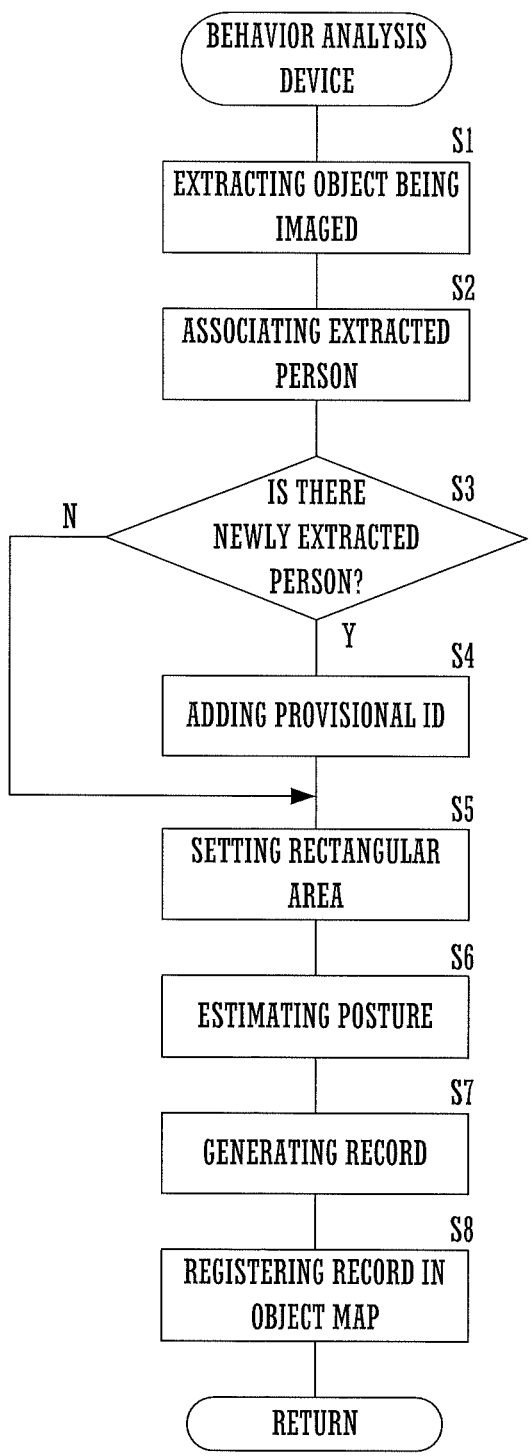
FIG. 5 is a flowchart showing an operation of the behavior analysis device.

FIG. 5 is a flowchart showing the operation of the behavior analysis device. The behavior analysis device 1 processes a frame image being imaged by the video camera 2, the frame image being input into the image input portion 12, in the image processing portion 13, and extracts an object (a person and an article) being imaged (S1). In step S1, for example, the behavior analysis device 1 generates a differential image of a background and extracts an object being imaged from the differential image.

The image processing portion 13 associates the person extracted from the previously processed frame image with the person extracted in step S1 (S2). The image processing portion 13 uses the spatio-temporal MRF model to extract a person as a person area in units of an 8 pixels×8 pixels block. In step S2, the person extracted from the previously processed frame image and the person extracted in step S1 may be associated with each other to obtain the moving direction and moving amount of the currently extracted person, thereby allowing the tracking of the person.

A person who is extracted in the current process and has not been extracted in the previous process (that is, a newly extracted person in the current process) is added with a provisional ID (S3 and S4). The person to whom the provisional ID is added is a person who has entered the imaging area of the video camera 2 during a time between the previous process of the frame image and the current process of the frame image.

It should be noted that a person who has been extracted in the previous process but is not extracted in the current process is a person who has moved out of the imaging area of the video camera 2 during the time between the previous process of the frame image and the current process of the frame image.

The image processing portion 13 sets up a rectangular area surrounding the person for each person who has been extracted in the current process (S5). The image processing portion 13, for each person who has been extracted in the current process, detects the height and the width of the rectangular area set up in step S5, calculates an aspect ratio (a horizontal to vertical ratio), and estimates the posture of the person (only for a person) (S6). In step S6, as stated above, the posture of the object is estimated that:

the object is in a standing position if the ratio of the height α and the width β of the rectangular area surrounding the object is β/α<0.6;

the object is in a stooping or jumping position if the ratio is 0.6<β/α<1.5; and the object is in a lying position if the ratio is 1.5<β/α.

Also in step S6, for each person who has been extracted in the current process, the height of the upper side and the height of the lower side of the set rectangular area are detected.

The image processing portion 13, for each of the objects extracted from the frame image in the current process, generates a record to be registered in the object map (S7). In step S7, as shown in FIGS. 2A and 2B, the record is generated by associating a type of an object (a person or an article), a posture (only for a person), a position, a height of an upper side of the rectangular area surrounding the object, a height of a lower side of the rectangular area surrounding the object, location information, and time.

It is to be noted that the determination of whether the extracted object is a person or an article is made in such a manner as to determine the extracted object as an article when the position of the object is unchanged and a certain period of time passes. In other words, the object is determined as a person when the position of the object (the moving object) is changed before a certain period of time passes. The details of the determination of whether the object is a person or an article will be described later.

The behavior analysis device 1 registers the record generated in step S7 in the object map (S8). The behavior analysis device 1 stores the object map in the storage portion 14.

By repeating the processes of the above stated steps S1 to S8, the behavior analysis device 1 creates an object map (see FIGS. 2A and 2B) of a person and an article that are positioned in the imaging area of the video camera 2, and stores the map in the storage portion 14.

Subsequently, the technique of determining a type (a person or an article) of the object on the basis of the object map created in the above stated process will be described.

The control portion 11 performs the determination based on the above described object map. The determination is made only for an object that has not been determined as a person or an article and is not repeated for an object that has already been determined. FIG. 6 is a flowchart for determining a type of the object.

The control portion 11 extracts an object of which the type is not determined from the object map (S11). The control portion 11, for each object extracted in step S11, determines whether or not the position of the object has been changed in the process of the imaged images of the previous 10 frames (S12). The control portion 11 determines that the object of which the position has been changed is a person. On the other hand, it is determined for the object of which the position has not been changed in the process of the imaged images of the previous 10 frames whether or not the object exists in the frame image the previous 50 frames before (S13). In step S13, it is determined whether or not the object is an installed article that is temporarily under the shadow of other objects and has not been imaged by the video camera 2. The control portion 11 determines that the object is an article (a left article) if the object does not exist even in the frame image the previous 50 frames before in step S13 (S14).

It should be noted that the control portion 11, when determining in step S12 that the position of the object has been changed in the imaged images of the previous 10 frames, determines that the object is a person (S15). In addition, the control portion 11, when determining in step S13 that the object exists in the frame image the previous 50 frames before, determines that the object is an installed article (S16).

Thus, the behavior analysis device 1 determines the type of the object positioned in the imaging area of the video camera 2.

Additionally, the behavior analysis device 1 uses the object map created in the above described process and can search a person who has left the object determined as a left article in step S14. Specifically, the behavior analysis device 1 searches from the object map a person who is positioned in the location in which the left article is left immediately before the left article is detected. Accordingly, the person who has left the left article can be identified. Similarly, by using the object map, the behavior analysis device 1 can search a person involved in a fight, a quarrel, and the like.

Further, as above described, the object map is associated with location information which shows the location in which the object is positioned. By using the aspect ratio of the object, the behavior of the object (the person) can be accurately determined. For example, when the location information of the location in which a person as an object is positioned shows a floor and the posture is in the lying position, the person is determined as a falling down drunken person. When the location information of the location in which a person as an object is positioned shows a bench and the posture is in the stooping position, the person is determined to be sitting on the bench. When the location information of the location in which a person as an object is positioned shows a bench and the posture is in the lying position, the person is determined to be lying down on the bench. When the location information of the location in which a person as an object is positioned shows a garbage can area and the posture is in the standing position, the person is determined to be scavenging a garbage can.

It is to be noted that whether or not the object is a drunken person may be determined by the moving speed of the person. In general, the moving speed of a drunken person is slow. The moving speed is obtained from the object map.

Furthermore, as stated above, since the height of the upper side of the rectangular area surrounding an object and the height of the lower side of the rectangular area surrounding the object are registered in the object map, whether the person has jumped up or stooped down can be determined. That is to say, the person is determined to have jumped up when the height of the lower side is positioned higher than the floor, and the person is determined to have stooped down when the height of the lower side is positioned on the floor.

Figure 7A:
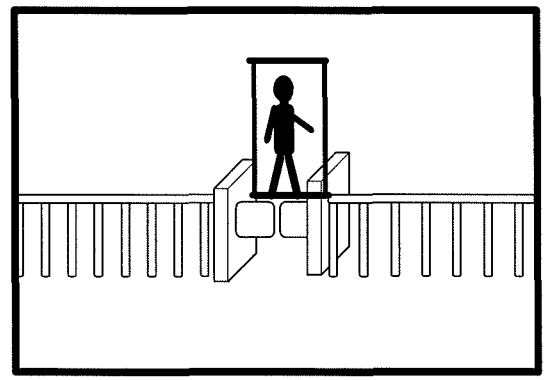
FIGS. 7A, 7B, and 7C are views showing detection of illegal passing in an automatic ticket gate.
Figure 7B:
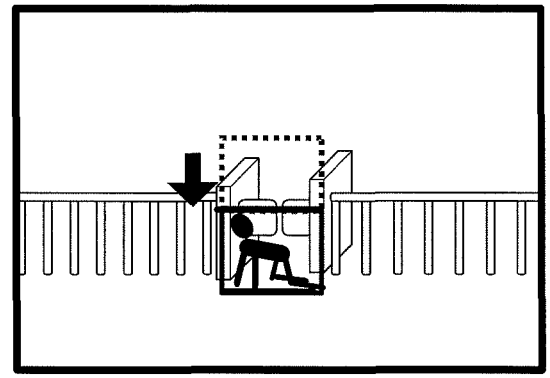
Figure 7C:
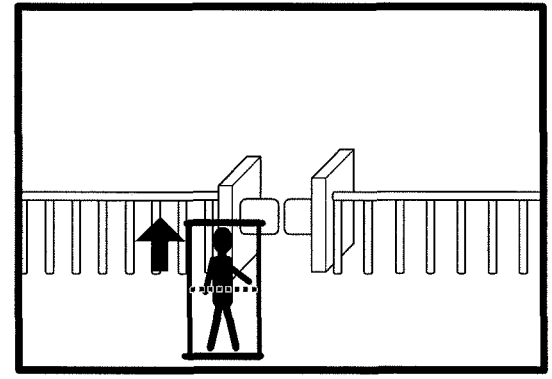

Moreover, as shown in FIGS. 7A, 7B, and 7C, when the person stoops down and illegally passes through the gate of an automatic ticket gate, the upper side of the rectangle surrounding the illegally passing person is temporarily lowered (see FIG. 7B). FIG. 7A shows a frame image of the person immediately before the entry into a passage of the automatic ticket gate. FIG. 7B shows a frame image of the person passing (in the stooping position) the passage of the automatic ticket gate. FIG. 7C shows a frame image of the person leaving from the passage of the automatic ticket gate. That is to say, when it is detected that a person who is passing the passage of an automatic ticket gate has temporarily stooped down, the person can be determined as an illegally passing person of the automatic ticket gate.

Figure 8A:
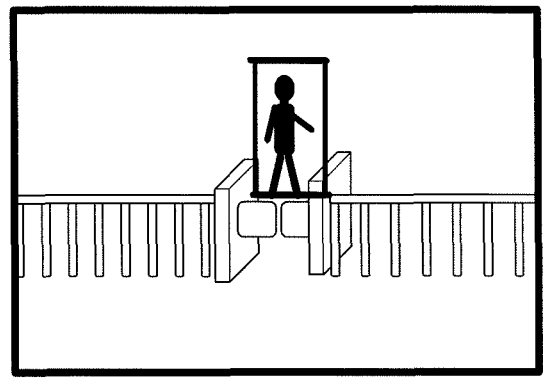
FIGS. 8A, 8B, and 8C are views showing the detection of illegal passing in the automatic ticket gate.
Figure 8B:
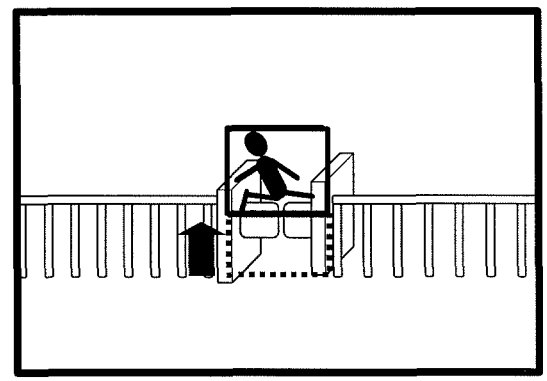
Figure 8C:
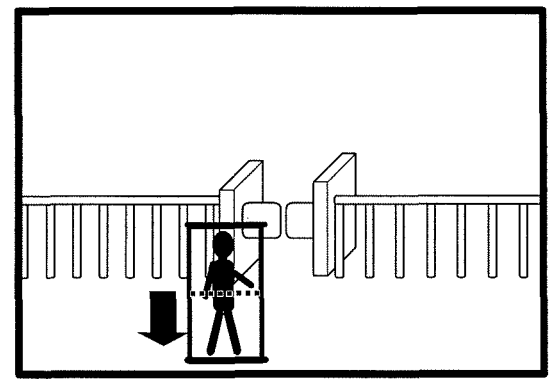

Alternatively, as shown in FIGS. 8A, 8B, and 8C, when the person jumps up and illegally passes over the gate of the automatic ticket gate, the lower side of the rectangle surrounding the illegally passing person is temporarily heightened (see FIG. 8B). FIG. 8A shows a frame image of the person immediately before the entry into the passage of the automatic ticket gate. FIG. 8B shows a frame image of the person passing (in the position of jumping over the gate) the passage of the automatic ticket gate. FIG. 8C shows a frame image of the person leaving from the passage of the automatic ticket gate. That is to say, when it is detected that a person who is passing the passage of an automatic ticket gate has temporarily jumped up, the person can be determined as an illegally passing person of the automatic ticket gate.

It should be noted that since the position is determined by using the aspect ratio of the rectangle surrounding an object (a passing person), erroneous determination that a passing person in the standing position is determined as a person having stooped down or jumped up is suppressed.

Figure 9A:
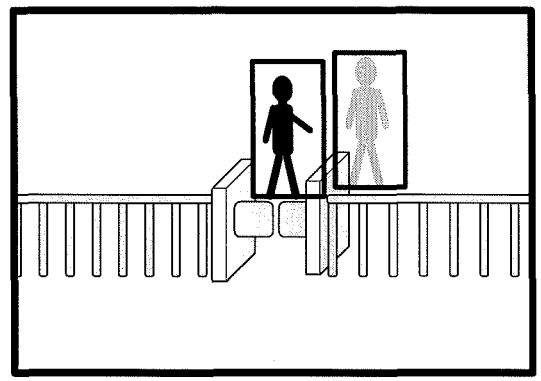
FIGS. 9A, 9B, and 9C are views showing the detection of illegal passing in the automatic ticket gate.
Figure 9B:
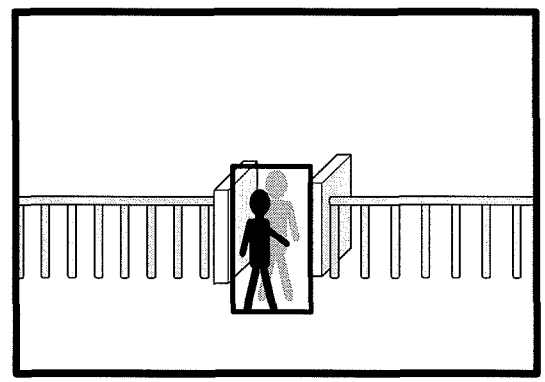
Figure 9C:
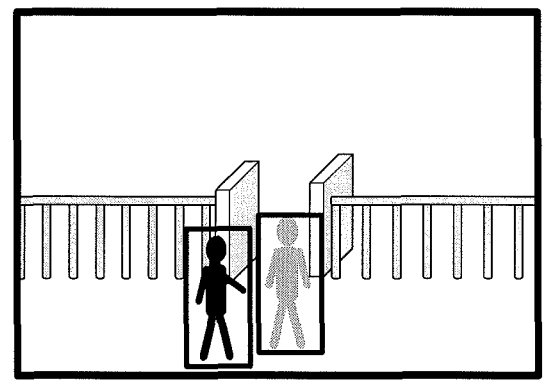

Further, illegal passing of tailgating can also be detected by using the number of passing persons obtained from the automatic ticket gate. For example, FIG. 9A shows a frame image of persons immediately before the entry into the passage of the automatic ticket gate. FIG. 9B shows a frame image of the persons passing the passage of the automatic ticket gate. FIG. 9C shows a frame image of the persons leaving from the passage of the automatic ticket gate. As shown in FIGS. 9A and 9C, when two persons are detected at the entrance or the exit of an automatic ticket gate and the number of passing persons in the passage obtained from the automatic ticket gate is one, the passing can be determined as tailgating.

Thus, the behavior analysis device 1 according to one or more embodiments of the present invention determines the behavior of the object on the basis of the aspect ratio as a ratio of the height and the width of the extracted object. That is to say, since the behavior analysis device 1 uses no three-dimensional information of the object, the increases in the size and cost of the system are adequately suppressed.

Figure 10:
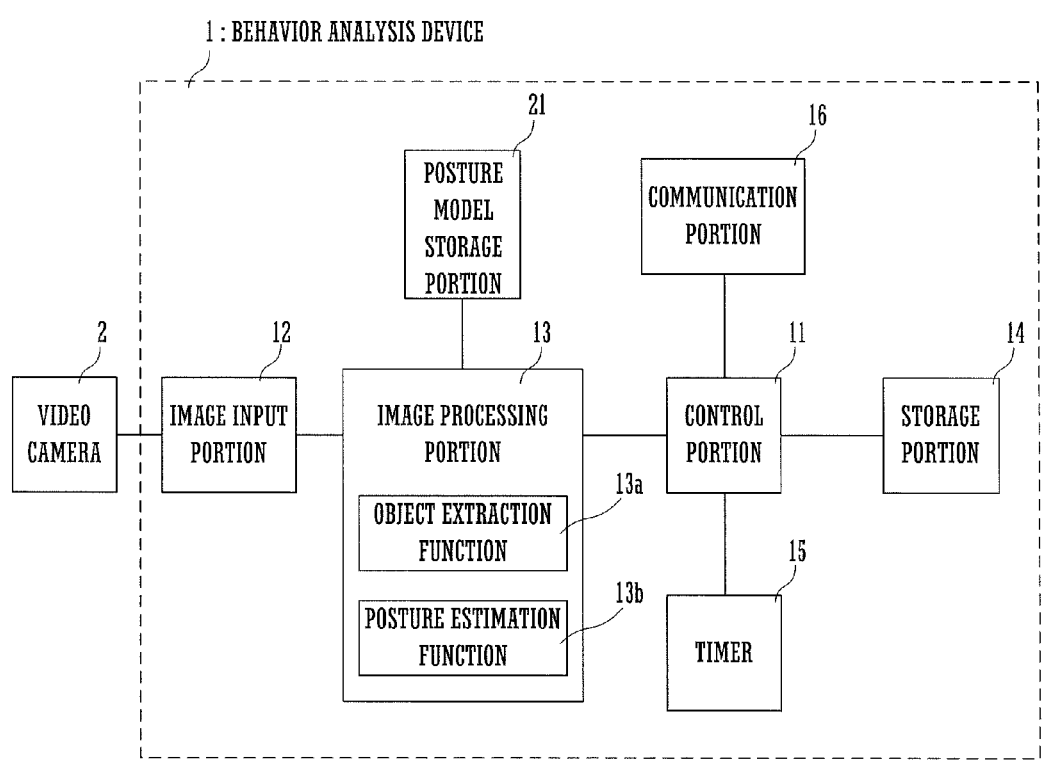
FIG. 10 is a block diagram showing a configuration of a main part of another behavior analysis device.

Subsequently, description will be made of one or more embodiments of the present invention. The behavior analysis device 1 according to one or more embodiments of the present invention also has the configuration as shown in FIG. 10. As shown in FIG. 10, the behavior analysis device 1 according to one or more embodiments of the present invention differs from the above described behavior analysis device in that a posture model storage portion 21 is provided. In addition, as will be described later, the process in step S6 of estimating of the posture is different.

Figure 11A:
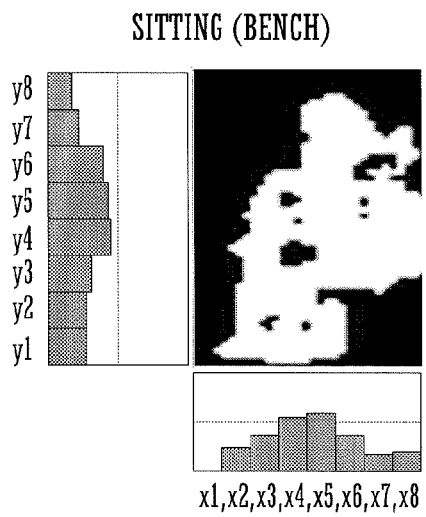
FIGS. 11A, 11B, and 11C are views showing examples of a silhouette image.
Figure 11B:
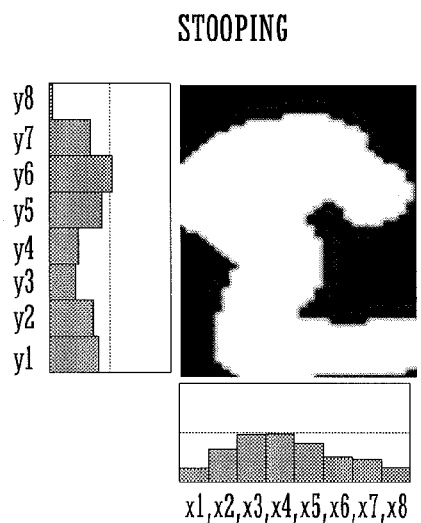
Figure 11C:
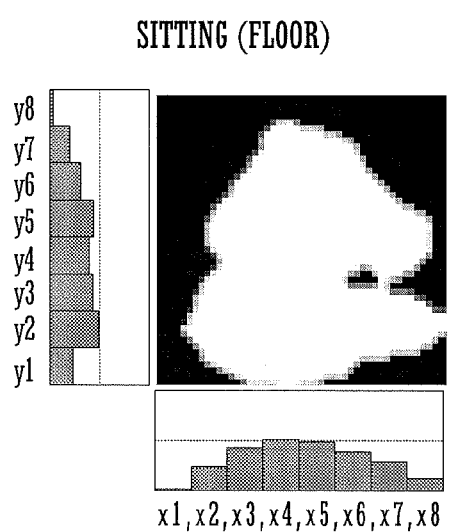

The posture model storage portion 21 stores a model vector of a feature amount for each posture of an object. This model vector is obtained for each posture by processing the image of the object imaged by the video camera 2. Specifically, the object is imaged for each posture by the video camera 2 and the object being imaged in the imaged image is extracted. A rectangular area surrounding the extracted object is set up. A silhouette image (a binary image) is generated by differentiating the object in the rectangular area set up here from the others (see FIGS. 11A, 11B, and 11C). FIGS. 11A and 11B show the silhouette images of a person sitting on the bench, and FIG. 11C shows the silhouette image of a person sitting on the floor. FIG. 11A shows the person in the position of straightening up the back, and FIGS. 11B and 11C show the person in the position of arching the back and bowing. The posture model storage portion 21 stores a feature amount vector created on the basis of the perpendicular histogram (x1 to xn) and the horizontal histogram (y1 to ym) of the silhouette images as a model vector X of the relevant posture. The model vector X is created as follows.

In order to suppress an influence due to differences in size of the silhouette image used for the creation, the perpendicular histogram (x1 to xn) and the horizontal histogram (y1 to ym) are created by normalizing the silhouette image into a size obtained by n dividing (n=8 in FIGS. 11A, 11B, and 11C) in the perpendicular direction and by m dividing (m=8 in FIGS. 11A, 11B, and 11C) in the horizontal direction. The model vector X is a n+m (8+8=16 in FIGS. 11A, 11B, and 11C) dimensional vector (x1, x2, ... xn, y1, y2, ym) on the basis of on the created perpendicular histogram and horizontal histogram.

The behavior analysis device 1 also creates object maps as shown in FIGS. 12A and 12B. One or more embodiments of the present invention differs from one or more of the above stated embodiments in that the height of the upper side of the rectangular area surrounding the extracted object and the height of the lower side of the rectangular area surrounding the extracted object are not registered.

Subsequently, the process (the process of the above stated step S6) of estimating the posture of the object in the behavior analysis device 1 will be described.

As stated above, the object extraction function 13a of the image processing portion 13 sets up in step S5 a rectangular area surrounding the person for each person who has been extracted in the current process. The posture estimation function 13b, for each object that has been extracted in the current process, generates a silhouette image created by differentiating the object in the rectangular area set up in the step S5 from the others. The object extraction function 13a obtains a feature amount vector Y of the object based on the perpendicular histogram (x1 to xn) and the horizontal histogram (y1 to ym) of the silhouette image generated here. The feature amount vector Y of the object is also, as with the above described model vector X, a n+m (8+8=16 in FIGS. 11A, 11B, and 11C) dimensional vector (x1, x2, ... xn, y1, y2, ... ym) on the basis of the perpendicular histogram (x1 to xn) and horizontal histogram (y1 to ym) created by normalizing the silhouette image into a size obtained by n dividing in the perpendicular direction and by m dividing in the horizontal direction.

The posture estimation function 13b, for each object, calculates a distance (a similarity) between the feature amount vector Y obtained for the object, and the model vector X of each of the postures stored by the posture model storage portion 21. Then, the posture of the object is estimated to be a posture corresponding to a model vector X which has the minimum distance calculated here and which is less than a predetermined threshold value. On the other hand, the posture of the object is determined unknown unless the model vector X is less than the predetermined threshold value even when the model vector X has the minimum distance calculated here.

It is to be noted that the behavior analysis device 1 has the same processes as one or more of the above stated embodiments except the process in step S6.

Thus, since the behavior analysis device 1 according to one or more embodiments of the present invention estimates the posture of an object (a person) from a silhouette image, even a difference in the posture of a person sitting on the bench, for example, can be determined, the difference being between the person sitting straightening up the back and the person sitting bowing while arching the back.

Figure 13:
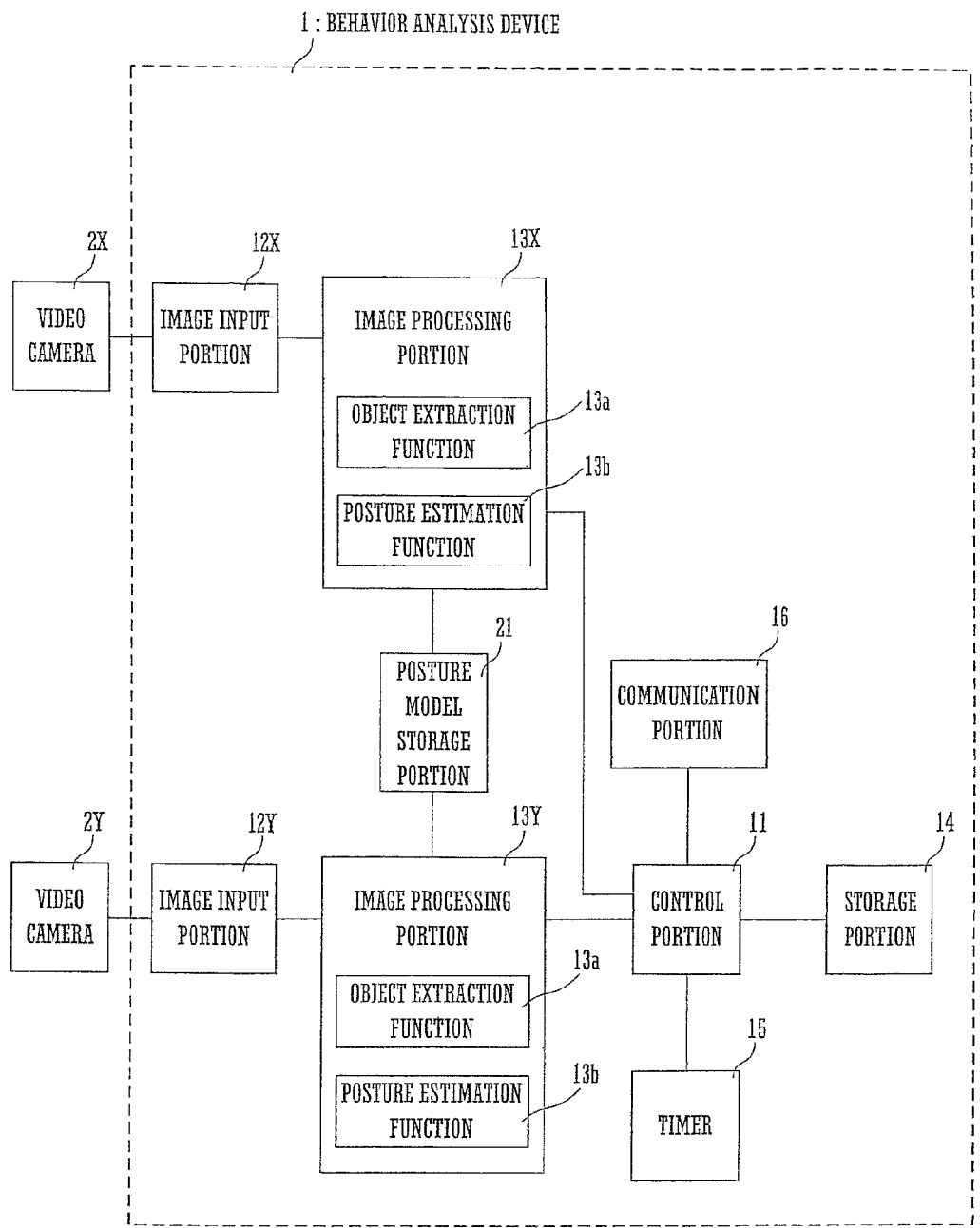
FIG. 13 is a block diagram showing a configuration of a main part of another behavior analysis device.

In addition, the behavior analysis device 1, as shown in FIG. 13, may be configured to have two video cameras 2 (2X, 2Y), two image input portions 12 (12X, 12Y), and two image processing portions 13 (13X, 13Y).

The behavior analysis device 1 according to one or more embodiments of the present invention processes a frame image being imaged by the two video camera 2 (2X, 2Y) installed as monitoring cameras and extracts an object (a person and an article) being imaged. The video cameras 2X and 2Y are the same as the video camera in one or more of the above stated embodiments. The two sets of video cameras 2X and 2Y image the same monitoring target area. The angle (the imaging direction) of the video camera 2X to the monitoring target area and the angle (the imaging direction) of the video camera 2Y to the monitoring target area differ approximately 90 degrees.

Into the image input portion 12X, the frame image being imaged by the video camera 2X connected to the image input portion 12X is input. Into the image input portion 12Y, the frame image being imaged by the video camera 2Y connected to the image input portion 12Y is input.

The image processing portion 13X processes the image that is imaged by the video camera 2X and input into the image input portion 12X. The image processing portion 13Y processes the image that is imaged by the video camera 2Y and input into the image input portion 12Y. The image processing portions 13 (13X, 13Y) also have the object extraction function 13a and the posture estimation function 13b. The image processing portions 13 (13X, 13Y) perform the process of estimating the posture of the object being imaged from the above described silhouette image.

More specifically, the image processing portion 13X estimates the posture of the object imaged in the imaged image of the monitoring target area imaged by the video camera 2X. The image processing portion 13Y estimates the posture of the object imaged in the imaged image of the monitoring target area imaged by the video camera 2Y. In other words, the posture of the object positioned in the monitoring target area is estimated not only by the imaged image imaged by the video camera 2X but by the imaged image imaged by the video camera 2Y.

In one or more embodiments of the present invention, the generated object map is an object map in which a record obtained by integrating a record generated by the image processing portion 13X in step S7 and a record generated by the image processing portion 13Y in step S7 is registered. The control portion 11 performs the process of integrating the records.

The control portion 11 performs an identification process that associates (identifies) the object extracted by the image processing portion 13X with the object extracted by the image processing portion 13Y.

The identification process that identifies the object extracted by the image processing portion 13X and the object extracted by the image processing portion 13Y will be described here.

The behavior analysis device 1 stores in the storage portion 14 coordinate transformation information indicating the relative positional relationship between a two-dimensional coordinate system of the frame image imaged by the video camera 2X and a two-dimensional coordinate system of the frame image imaged by the video camera 2Y. The coordinate transformation information is information that provides projective transformation of the two-dimensional coordinate system of the frame image imaged by the video camera 2X and the two-dimensional coordinate system of the frame image imaged by the video camera 2Y into a common coordinate system. In one or more embodiments of the present invention, the coordinate transformation information stored in the storage section 14 includes a first coordinate transformation parameter and a second coordinate transformation parameter to be described below. The first coordinate transformation parameter is a parameter for projective transformation of the two-dimensional coordinate system of the frame image imaged by the video camera 2X into the two-dimensional coordinate system of the frame image imaged by the video camera 2Y. The second coordinate transformation parameter is a parameter for projective transformation of the two-dimensional coordinate system of the frame image imaged by the video camera 2Y into the two-dimensional coordinate system of the frame image imaged by the video camera 2X.

It is to be noted that the coordinate transformation information may include only one of the first coordinate transformation parameter and the second coordinate transformation parameter.

The first coordinate transformation parameter and the second coordinate transformation parameter will now be described in more detail below. The first coordinate transformation parameter and the second coordinate transformation parameter are values calculated using the frame image actually imaged at a time of installation of the video cameras 2X and 2Y.

First, when the installation of the video cameras 2X and 2Y is completed, a tape or the like is used to mark four points on the floor in the monitoring target area. Then, a frame image imaged by the video camera 2X is processed to detect the coordinates (x, y) of the position of each of the four points marked on the frame image. Similarly, the coordinates (X, Y) of the position of each of the four points marked on the frame image imaged by the video camera 2Y are detected. Then, the coordinates of the position of each of the marked points are substituted into the following equations:

$$X=(a1x+b1y+c1)/(a0x+b0y+1)$$

$$Y=(a2x+b2y+c2)/(a0x+b0y+1),$$

to obtain simultaneous equations with eight unknowns. Eight constants: a0, b0, a1, b1, c1, a2, b2 and c2 that constitute the solution to the simultaneous equations with eight unknowns, form the first coordinate transformation parameter for projective transformation of the two-dimensional coordinate system of the frame image imaged by the video camera 2X into the two-dimensional coordinate system of the frame image imaged by the video camera 2Y.

Similarly, the coordinates of the position of each of the marked points are substituted into the following equations:

$$x=(A1X+B1Y+C1)/(A0X+B0Y+1)$$

$$y=(A2X+B2Y+C2)/(A0X+B0Y+1),$$

to obtain simultaneous equations with eight unknowns. Eight coefficients: A0, B0, A1, B1, C1, A2, B2 and C2 that constitute the solution to the simultaneous equations with eight unknowns, form the second coordinate transformation parameter for projective transformation of the two-dimensional coordinate system of the frame image imaged by the video camera 2Y into the two-dimensional coordinate system of the frame image imaged by the video camera 2X.

In identifying the object on the frame image imaged by the video cameras 2X and 2Y, for each object imaged by one 2X of the video cameras, the coordinates of the position on the frame image are obtained. Also, for each object imaged by the other 2Y of the video cameras, the coordinates of the position on the frame image are obtained. The coordinates of the position can be obtained from the record created by the image processing portions 13X and 13Y in step S7. Then, combination patterns are created for associating the objects on a one-to-one basis. The number of such combination patterns created here is two if two objects are positioned while the number of such combination patterns created here is six if three objects are positioned, for example.

Further, the behavior analysis device 1, for each object imaged by the one 2X of the video cameras, uses the first coordinate transformation parameter to provide projective transformation of the coordinates of the position of the object into the two-dimensional coordinate system of the frame image imaged by the other 2Y of the video cameras. The behavior analysis device 1, for each of the object combination patterns, calculates a first distance energy that is the sum total of distances between the corresponding objects in the two-dimensional coordinate system of the frame image imaged by the other 2Y of the video cameras.

Alternatively, the behavior analysis device 1, for each of the objects imaged by the other 2Y of the video cameras, uses the second coordinate transformation parameter to provide projective transformation of the coordinates of the position of the object into the two-dimensional coordinate system of the frame image imaged by the one 2X of the video cameras. The behavior analysis device 1, for each of the object combination patterns, calculates a second distance energy that is the sum total of distances between the corresponding objects in the two-dimensional coordinate system of the frame image imaged by the one 2X of the video cameras.

Then, the behavior analysis device 1 determines that a combination pattern such that the sum of the first distance energy and the second distance energy is the minimum of all the combinations of the objects positioned in the monitoring target area is the appropriate association of the objects being imaged and identifies the pattern.

This integrated record is registered in the object map. In this object map, as shown in FIGS. 14A and 14B, both the posture of the object estimated by the image processing portion 13X and the posture of the object estimated by the image processing portion 13Y are registered.

Additionally, the behavior analysis device 1 determines the behavior of the object by using the posture of the object estimated by the image processing portion 13X and the posture of the object estimated by the image processing portion 13Y. For example, the behavior analysis device 1 stores a behavior determination table as shown in FIGS. 15A, 15B, and 15C in the storage portion 14. The behavior determination table stores behaviors for each of the locations such as a ticket gate area (see FIG. 15A), a bench area (see FIG. 15B), and a floor (see FIG. 15C). The behavior determination table is a table that associates the posture of the object estimated by the image processing portion 13X and the posture of the object estimated by the image processing portion 13Y with the behavior of the object. For example, if a person is in a ticket gate area, and both the posture of the object estimated by the image processing portion 13X and the posture of the object estimated by the image processing portion 13Y show a standing position, the person can be determined as an appropriate user. On the other hand, at least one of the posture of the object estimated by the image processing portion 13X and the posture of the object estimated by the image processing portion 13Y does not show a standing position, the person can be determined as an illegal user (abnormal behavior).

Furthermore, since the angle of the video camera 2X to the monitoring target area and the angle of the video camera 2Y to the monitoring target area differ approximately 90 degrees, in a case in which an object is a person, at least one of the video cameras 2 can image the object from the horizontal direction, so that the estimation accuracy of the posture can be improved. In addition, even when the object is not imaged by the one of the video cameras 2 due to occlusion, there is a high possibility that the object is imaged by the other of the video cameras 2, so that the extraction accuracy of an object can be also improved.

It should be noted that while one or more of the above described embodiments shows a configuration provided with two systems: two video cameras 2 (2X, 2Y), two image input portions 12 (12X, 12Y), and two image processing portions 13 (13X, 13Y), a configuration may be provided with more than two systems.

While one or more of the above described embodiments exemplify that the behavior analysis device 1 determines the behavior of the object at a ticket gate of a station and a station platform, one or more embodiments of the present invention can also be applied to other locations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 Behavior analysis device
2 (2X, 2Y) Video camera
11 Control portion
12 (12X, 12Y) Image input portion
13 (13X, 13Y) Image processing portion
13a Object extraction function
13b Posture estimation function
14 Storage portion
15 Timer
16 Communication portion
21 Posture model storage portion

The invention claimed is:

1. A behavior analysis device comprising:
an object extraction portion that processes a frame image of an imaging area being imaged by an imaging device and extracts an object being imaged;
a position detection portion that detects a position in the imaging area, for each object extracted by the object extraction portion;
a posture estimation portion that estimates a posture of the object, for each object extracted by the object extraction portion; and
a behavior determination portion that determines a behavior of the object, for each object extracted by the object extraction portion, based on the position in the imaging area that is detected by the position detection portion and the posture estimated by the posture estimation portion
wherein the posture estimation portion, for each object extracted by the object extraction portion, sets up a rectangular area surrounding the object and estimates the posture of the object based on a ratio between a height of the rectangular area and a width of the rectangular area, a height of an upper side of the rectangular area, and a height of a lower side of the rectangular area.

2. The behavior analysis device according to claim 1, further comprising:
a posture model storage portion that stores a shape model of the object in the posture for each posture of the object, wherein:
the posture estimation portion, for each object extracted by the object extraction portion, calculates a similarity with the shape model stored by the posture model storage portion and estimates the posture of the object based on the calculated similarity.

3. The behavior analysis device according to claim 2, wherein the posture estimation portion estimates a posture corresponding to a shape model of which the calculated similarity is a maximum similarity as the posture of the object.

4. The behavior analysis device according to claim 2, further comprising
an identification portion, wherein:
the object extraction portion extracts the imaged object for each frame image of the imaging area being imaged by different angles by a plurality of imaging devices;
the identification portion identifies the object extracted by the object extraction portion among a plurality of the frame images imaged by the plurality of imaging devices; and
the behavior determination portion determines the posture of the object extracted by the object extraction portion and identified by the identification portion by using a combination of the postures estimated for each frame image being imaged by the plurality of imaging devices.

5. The behavior analysis device according to claim 1, further comprising:
a location information storage portion that stores location information set up by associating an area on the corresponding frame image with an environment of a location for each area obtained by dividing the imaging area into a plurality of areas, wherein:
the behavior determination portion determines the behavior of the object in view of the environment of the location obtained from the location information, the location being in which the object is positioned.

6. The behavior analysis device according to claim 5, further comprising:
an object map creation portion that creates an object map in which the position detected by the position detection portion and the posture estimated by the posture estimation portion are registered in time sequence for the object extracted by the object extraction portion, wherein
the behavior determination portion determines the behavior of the object from a change in the position of the object with a lapse of time and from a change in the estimated posture, the changes being obtained from the object map created by the object map creation portion.

* * * * *